Sept. 4, 1956 TUNG CHANG CHEN 2,761,998

PULSE LENGTHENING CIRCUIT

Filed Aug. 14, 1952

INVENTOR
TUNG CHANG CHEN
BY
Donald W. Phillion
ATTORNEY

United States Patent Office 2,761,998
Patented Sept. 4, 1956

2,761,998

PULSE LENGTHENING CIRCUIT

Tung Chang Chen, Havertown, Pa., assignor to Burroughs Corporation, Detroit, Mich., a corporation of Michigan

Application August 14, 1952, Serial No. 304,267

2 Claims. (Cl. 317—149)

This invention relates generally to electrical pulse responsive circuitry and more particularly to pulse lengthening circuits.

Many cases arise in the design and application of electrical circuits wherein a very small power signal pulse is available to perform a function which requires either a greater power input signal or a longer power input signal in point of time. Typical of such instances is the case where it is desired to operate an electromagnetic relay in response to a signal having a duration of perhaps a few microseconds. Due to the inductive nature of the relay windings it would ordinarily not be feasible to energize the winding in such a short period of time. Another example is the case where the input signal is too weak to operate the relay. There are other situations in which the circuitry should be capable of retaining information or remembering that a short or weak impulse was generated. This would involve a memory of some type which would respond to such a weak input pulse or to such a short time duration input pulse.

To meet this problem there are several means well known in the prior art. For example, amplifying circuits employing vacuum tubes, thyratron circuits, and other means have been utilized. These types of circuits are, however, quite expensive. It is advantageous to have an inexpensive and efficient circuit means which will be responsive to very short duration pulses or to comparatively weak signal input pulses of a somewhat longer duration.

It is an object of this invention to provide an efficient, inexpensive circuit means responsive to input signal pulses of the order of a few microseconds.

It is a further object of the invention to provide an inexpensive pulse lengthening circuit.

Another object of the invention is to provide means for energizing relatively slow-to-energize circuits from a signal having a time duration of the order of a few microseconds.

Another object of the invention is to provide an efficient and inexpensive circuit means responsive to relatively weak signal input impulses.

Another object is to provide an inexpensive means of amplifying and lengthening an input signal pulse having a time duration of the order of a few microseconds.

In accordance with one embodiment of the invention an asymmetrical device electrically connects the cathode of the gaseous discharge device with an impedance. A voltage means is impressed across the said circuitry of a value greater than the value of the sustaining voltage of said gaseous discharge device, but less than the value of the ionizing voltage of said gaseous discharge device. Input means connected between said asymmetrical device and said gaseous discharge device is provided. Input pulses applied to said input conductor increase the potential across the gaseous discharge device to a value greater than the value of the ionizing voltage of said gaseous discharge device. Once conductive the said gaseous discharge device will not become extinguished even though the input pulse applied to the input line is terminated inasmuch as the said first voltage means has a value greater than the sustaining potential value of said gaseous discharge device.

In accordance with one feature of the invention the said impedance can comprise the winding of a relay means which, upon energization, will close the contact means to connect a second impedance across said gaseous discharge device in such a manner and of such a value as to diminish the current flow through said gaseous discharge device below the value necessary to sustain ionization.

In accordance with another feature of the invention an electrical storage means such as a capacitor is utilized to lengthen an input pulse of very short duration until it is of a greater time length than the time necessary to ionize said gaseous discharge device.

These and other objects and features of the invention will be more fully understood from the following detailed description when read in conjunction with the drawings in which.

Figure 1:
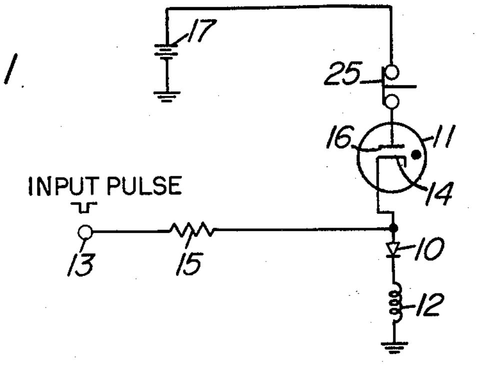
Fig. 1 is a schematic diagram of a basic embodiment of the invention.

Referring now to Fig. 1 there is shown a basic embodiment of the invention in which asymmetrical device 10 has its anode connected to the cathode of gaseous discharge device 11 and its cathode connected to the one terminal of the inductive impedance 12. In the preferred embodiment of the invention herein shown the gaseous discharge device 11 is a gas filled tube of the type NE–96 manufactured by General Electric Company, a corporationof New York. The tube 11 has a breakdown voltage of approximately 140 volts, and a sustaining voltage of approximately 80 volts at 50 microamperes. Asymmetrical device 10 preferably is of the selenium rectifier type having a forward impedance of about 100 ohms and a backward impedance of about 200,000 ohms. The inductive impedance 12 which may represent the winding of a relay should have an inductance and a resistance of such values as to permit a sustaining current to flow through the gaseous discharge device 11 before the termination of the negative input pulse on input conductor 13 which is electrically connected to the electrode 14 of gaseous discharge device 11 through 200,000 ohm resistance 15. The electrode 16 of gaseous tube 11 is connected to the positive terminal of 120 volt battery source 17 through reset switch 25.

Figures 2, 3:
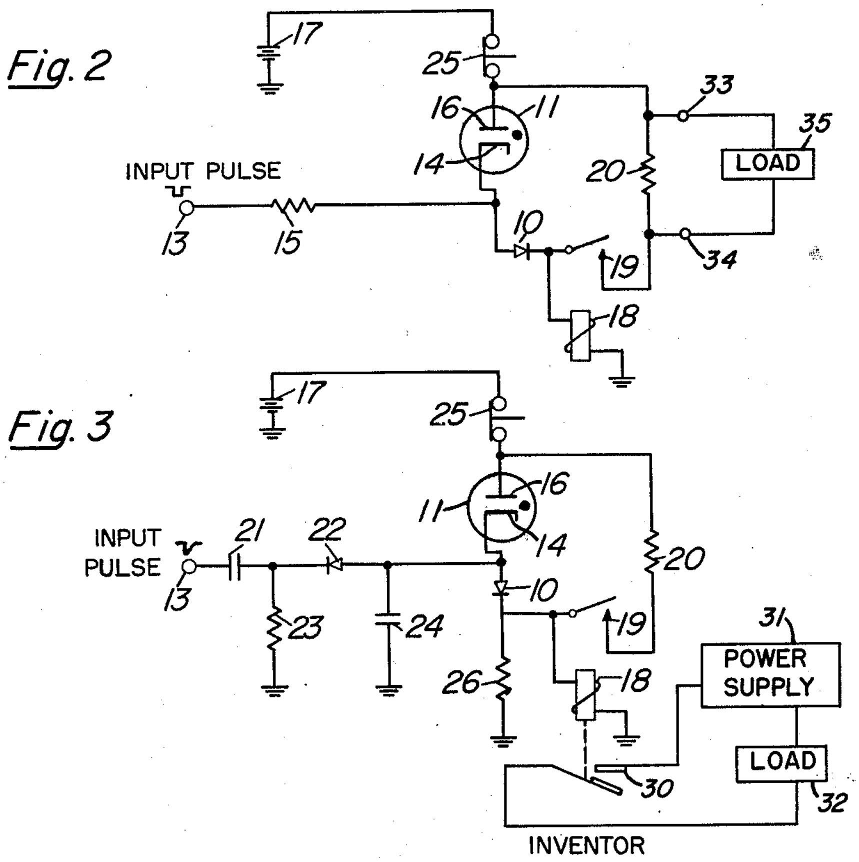
Fig. 2 is a schematic diagram of an embodiment of the invention adapted to receive electrical pulses of a weak magnitude and of the order of time somewhat greater than the time necessary to ioinize the said gaseous discharge device.
Fig. 3 is a schematic diagram of an embodiment of the invention adapted to operate with electrical pulses having a time duration shorter than the necessary time to ionize said gaseous discharge device.

Referring now to Fig. 2 there is shown an embodiment of the invention adapted to lengthen pulses of a time duration greater than the time necessary to ionize the gaseous discharge device used therein. Many of the circuit elements used in Fig. 2 may have the same value as those used in Fig. 1. Those circuit elements in Fig. 2 which can be the same as those used in Fig. 1 have the same reference characters. In Fig. 2, however, the element corresponding to the inductance 12 of Fig. 1 is actually the winding of a relay having associated contact 19. Closure of contact 19 due to the energization of the relay winding 18 connects 5,000 ohm (approximately) impedance 20 in parallel with said gaseous discharge device 11 which reduces the current through the gaseous discharge device 11 to a value below the value necessary to sustain ionization in said gaseous tube 11. Furthermore, the impedance 20 is connected between the positive terminal of the 120 volt battery source 17 and one terminal of the winding of relay 18 through contact 19 so that relay 18 remains energized after the gaseous discharge tube 11 is extinguished. Conductors 33 and 34 are connected across the impedance 20 and connected to the working load 35 so that the voltage developed across the impedance 20 will be impressed on the load 35.

Many of the circuit constants of the preferred embodiment of the invention shown in Fig. 3 are the same as corresponding elements of Figs. 1 and 2 in which instances they are identified with the same reference characters. The input pulse, which in this modification of the invention can be of a shorter duration than the time necessary to ionize the gaseous tube 11, is introduced to input conductor 13 which is coupled to the cathode 14 of gaseous tube 11 through .0005 microfarad capacitor 21 connected in series with asymmetrical device 22. Resistance 23 connects the junction of capacitor 21 and asymmetrical device 22 to ground. A .0005 microfarad capacitor 24 which is utilized to store electrical charge due to an input pulse impressed upon input conductor 13 connects the cathode of gaseous tube 11 to ground. The working circuit is comprised of contact 30, which is operable by relay 18, and the power supply 31 and load 32. When the relay 18 is energized the contact 30 is closed to connect the power supply 31 to the load 32. This working circuit illustrates a general example of how the invention may be utilized.

The operation of the invention will now be discussed in detail.

The general operation of the invention will be explained in connection with the embodiment shown in Fig. 1. Assume that under what is herein arbitrarily defined as normal conditions the gas tube 11 is in a non-ionized condition except for a negligible dark current, and consequently there is no appreciable current flow from the battery source 17 through tube 11, asymmetrical device 10, or the inductive impedance 12. The reset switch 25 is closed so that the full potential of battery source 17 will be applied across the cathode 14 and the anode 16 of the gas tube 11. This potential of 120 volts is insufficient to cause the gaseous tube 11 to become conductive since the breakdown voltage of the tube 11 is approximately 140 volts. If now a negative input pulse is applied to conductor 13 by some external means (not shown) of a value greater than negative 20 volts the gas tube 11 will have a voltage impressed across the cathode 14 and the anode 16 thereof of a value equal to the sum of the 120 volts of battery source 17 and the 20 volts or more of the input pulse applied on input conductor 13 which is a potential difference in excess of 140 volts. This potential difference is sufficient to cause breakdown of the gaseous tube 11.

As the gas tube 11 becomes ionized current begins to flow in a circuit extending from ground to positive battery source 17, switch 25, tube 11, asymmetrical device 10, inductance 12, to ground. Since the sustaining voltage of the tube 11 is 80 volts and since the value of voltage source 17 is 120 volts, there is a 40 volt allowed drop across the inductive load 12. The rate of rise of current in the tube 11 can not be greater than that which will cause more than a 40 volt drop across inductive load 12. Once ionized, the gas tube 11 will remain ionized until the circuit is opened by the opening of switch 25. The circuit has thus performed the function of having an input pulse of a few microseconds energize a circuit for an indefinite length of time. It should be noted that for the circuit of Fig. 1 the input pulse should last long enough so the current through inductance 12 exceeds the minimum amount of current for maintaining the ionization of gas tube 11.

Referring now to Fig. 2 in the embodiment of the invention shown therein the inductance 12 of Fig. 1 has been replaced with the winding of relay 18 of Fig. 2. Thus, when the input pulse is applied to conductor 13 of Fig. 2 to cause ionization of the gas tube 11 a current flow is established to ground from 120 volt battery source 17, switch 25, tube 11, asymmetrical device 10, winding of relay 18 to ground. Although the negative input pulse applied to input conductor 13 may terminate prior to the time the current through relay winding 18 has reached a stable value the tube 11 will remain ionized. When the current has increased to a value sufficient to operate relay 18 the contact 19 associated therewith will close and resistance 20 is placed in parallel with the gas tube 11, thus increasing the current through the winding of relay 18 to a point where the voltage drop thereacross is sufficient to cause deenergization of gas tube 11. The input pulse applied to input conductor 13 is thus lengthened into a long pulse across resistance 20. The length of the long pulse is determined by circuit constants including the potential of the voltage source 17, the critical voltage of tube 11, impedance of relay 18, and the value of the load resistance 20 and 35. It can be seen that the duration of the generated pulse across load resistance 20 can be varied substantially by changing circuit constants, such as for example, selecting relays having different operating time characteristics.

Referring now to Fig. 3 there is shown a circuit adapted to operate in response to an input pulse of such short duration as to ordinarily be not capable of causing ionization of gas tubes such as tube 11 of Fig. 3. As indicated in Figs. 1 and 2 the input pulse applied to conductor 13 is a negative input pulse in the preferred embodiments shown and described herein. If the pulse applied on conductor 13 is of such short duration as to be unable to ionize tube 11 there is provided a means in the form of capacitor 24 to accomplish a preliminary stretching of the input pulse into a pulse sufficiently long to operate the gas tube 11. This is accomplished in the following manner. The negative input pulse applied to conductor 13 conducts through capacitor 21 and through asymmetrical device 22 and charges capacitor 24 in a negative polarity. When the negative input pulse passes through asymmetrical device 22 the low forward impedance of asymmetrical device 22 is presented to the said negative input pulse. However, when capacitor 24 becomes charged in the negative polarity it must discharge through two paths, one through the high back impedance of asymmetrical device 22 and resistance 23 and the other path through the back impedance of asymmetrical device 10 and the parallel arrangement of resistance 26 and impedance of winding 18. Thus, although capacitor 24 will become charged negatively in a relatively short period of time it will take a substantially longer time to become discharged, thus in effect, lengthening the negative input pulse. Since the negatively charged side of the capacitor 24 is connected directly to one electrode of the gas diode 11 the negative charge creates a potential across the electrodes of the gas diode 11 equal to the potential of battery source 17 plus the charge on capacitor 24 which will persist after the termination of the negative input pulse upon input conductor 13 a sufficient length of time to cause ionization of gas tube 11. A new current path is then established from ground through 120 volt source 17, reset switch 25, gas tube 11, asymmetrical device 10, resistance 26, to ground. Winding of relay 18 is connected in parallel with resistance 26 to ground. The voltage drop across resistance 26 is sufficient to energize the winding of relay 18 to close the associated contact 19. Closure of contact 19 places resistance 20 in parallel with gas diode 11, thus diverting sufficient current from diode 11 to cause extinguishing thereof. It should be noted that resistance 26 when placed in parallel with the winding of relay 18 forms a resistance circuit path to ground during the time that the current in the winding of relay 18 is in a transient condition, thus preventing the induced voltage in relay 18 from extinguishing tube 11 immediately after the application of negative input pulse on conductor 13 but before the circuit has reached a stable condition. When the relay 18 is operated the contact 30 is also closed which connects the power supply 31 to the load 32.

If, in the circuits of Figs. 2 and 3, it is desired to lengthen the input pulse indefinitely the contact 19 can be connected to ground through resistance 20 rather than being connected to the anode 16 of diode 11.

It is to be noted that the embodiments of the invention herein shown and described are but preferred embodiments of the same and various changes may be made in the values of circuit constants and circuit arrangement without departing from the spirit or scope of said invention.

What is claimed is:

1. A pulse responsive circuit comprising, in combination, a gaseous discharge tube having only a pair of electrodes between which an electron path is capable of being formed, an asymmetrical device, a relay including a low impedance energizable winding and a switch magnetically attractable by the winding, said asymmetrical device and one of the electrodes of said tube and the winding of said relay being in electrical series relation with the asymmetrical device electrically positioned between the electrode and winding, means for applying a potential across said series relation of elements of such a value as to maintain a discharge in said tube but insufficient to initiate such discharge and of such a polarity as to cause said asymmetrical device to present a low impedance thereto, a shunting circuit including said switch and operable when the switch is closed to form a shunt around said tube and cause the extinguishment thereof, said switch being so disposed with respect to the winding of the relay that it is moved to closed position upon energization of the winding, and means to impress a signal voltage at a point in said series relation of elements between said tube and said asymmetrical device of value that in conjunction with the potential applied across said series relation of elements is sufficient to initiate a discharge between the electrodes of the tube, the discharge of said tube causing energization of the winding of said relay and the resulting shunting and extinguishment of the tube.

2. A pulse responsive power amplifier, comprising a gaseous discharge diode tube having only an anode electrode and a cathode electrode and having a predetermined ionization potential substantially higher than its extinction potential; an asymmetrically conductive device having two terminals, one of which is connected to said cathode electrode with a polarity permitting substantially unimpeded conduction of electron current through said asymmetrical device to said cathode; a relay means having a low impedance energizing winding and having a contact means closable by energization thereof, one side of said energizing winding and one side of said contact means being connected to the other of said terminals of said asymmetrical device; a low impedance electrical power source connecting said anode electrode to the other side of said energizing winding to apply therebetween a potential having polarity for providing electron current flow from said cathode to said anode electrode and having a magnitude of potential sufficient to maintain ionization in said gaseous diode but insufficient to initiate ionization therein; an impedance element connecting the other side of said contact means to said anode electrode to be in shunt relation to the series combination of said diode tube and said asymmetrical device whenever said contact means is closed by operation of the relay means; an electrical pulse signal potential source providing a pulse signal potential having a magnitude which, when added to said magnitude of said potential of said electrical power source, is sufficient to initiate ionization in said diode tube; and means for connecting said pulse signal potential source to said cathode electrode so that said pulse signal potential appears across a circuit impedance including said asymmetrical device and is developed effectively in series with the series combination of said electrical power source and said diode tube, said pulse signal potential having the polarity for providing electron current flow from said cathode to said anode electrode but not for providing unimpeded current flow through said asymmetrical device; whereby said pulse signal is effectively isolated from said energizing winding but is effective to establish ionization in said diode tube at low ionizing current levels, followed by conduction of relatively high diode currents from said power source to energize said relay means with closure of said contact means and thus to develop amplified signals due to current flow from said power source through the series circuit including said energizing winding, said contact means, and said impedance element.

References Cited in the file of this patent

UNITED STATES PATENTS

| | | |
|---|---|---|
| 2,231,695 | Vedder | Feb. 11, 1941 |
| 2,414,686 | Badmaiff | Jan. 21, 1947 |
| 2,433,254 | Aiken | Dec. 23, 1947 |
| 2,450,032 | Cann | Sept. 28, 1948 |
| 2,497,505 | Martin | Feb. 14, 1950 |
| 2,575,516 | Hagen | Nov. 20, 1951 |
| 2,646,534 | Manley | July 21, 1953 |

FOREIGN PATENTS

| | | |
|---|---|---|
| 522,986 | Great Britain | July 2, 1940 |